(12) United States Patent
Kurohara

(10) Patent No.: US 11,249,453 B2
(45) Date of Patent: Feb. 15, 2022

(54) NUMERICAL CONTROLLER

(71) Applicant: Fanuc Corporation, Yamanashi (JP)

(72) Inventor: Yasuyuki Kurohara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 395 days.

(21) Appl. No.: 16/511,628

(22) Filed: Jul. 15, 2019

(65) Prior Publication Data

US 2020/0026256 A1 Jan. 23, 2020

(30) Foreign Application Priority Data

Jul. 17, 2018 (JP) .............................. JP2018-134511

(51) Int. Cl.
    *G05B 19/19* (2006.01)
(52) U.S. Cl.
    CPC .... *G05B 19/19* (2013.01); *G05B 2219/36201* (2013.01); *G05B 2219/37199* (2013.01)
(58) Field of Classification Search
    None
    See application file for complete search history.

(56) References Cited

U.S. PATENT DOCUMENTS

| 5,854,751 A | 12/1998 | Di Pietro et al. | |
|---|---|---|---|
| 2008/0053977 A1 | 3/2008 | Yamazaki et al. | |
| 2016/0048124 A1* | 2/2016 | Madhavan | G06F 30/20 700/173 |
| 2017/0357231 A1 | 12/2017 | Kurohara | |

FOREIGN PATENT DOCUMENTS

| JP | 08-99252 A | 4/1996 |
|---|---|---|
| JP | 2001195112 A | 7/2001 |
| JP | 2005334919 A | 12/2005 |
| JP | 2008055438 A | 3/2008 |
| JP | 5162977 B2 | 3/2013 |
| JP | 2013105431 A | 5/2013 |
| JP | 5889606 B2 | 3/2016 |
| JP | 2017220177 A | 12/2017 |

OTHER PUBLICATIONS

Japanese Notice of Reasons for Refusal for Japanese Application No. 2018-134511, dated Sep. 29, 2020 with translation, 6 pages.

* cited by examiner

*Primary Examiner* — Sean Shechtman
(74) *Attorney, Agent, or Firm* — RatnerPrestia

(57) ABSTRACT

A numerical controller that machines a workpiece to create multiple machined holes with a predetermined machining position and a predetermined machining shape in the workpiece includes a thermal influence calculation unit that determines a temporal change in a heat distribution of the workpiece for each of the machined holes when the machined hole having the machining shape is created at the machining position, a machining position determination unit that determines a next machined hole that does not cause thermal deformation of the workpiece on the basis of an elapsed time that elapses from creation of a previously machined hole to creation of a next machined hole and a heat distribution resulting from creation of the previously machined hole and the next machined hole, and a machining unit that creates the machined holes. The numerical controller can determine the machining positions taking the thermal deformation into account.

10 Claims, 12 Drawing Sheets

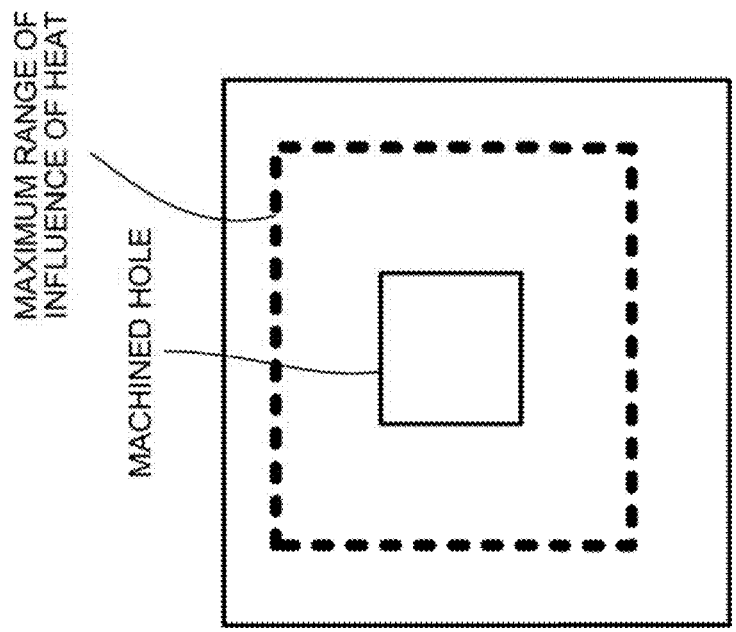
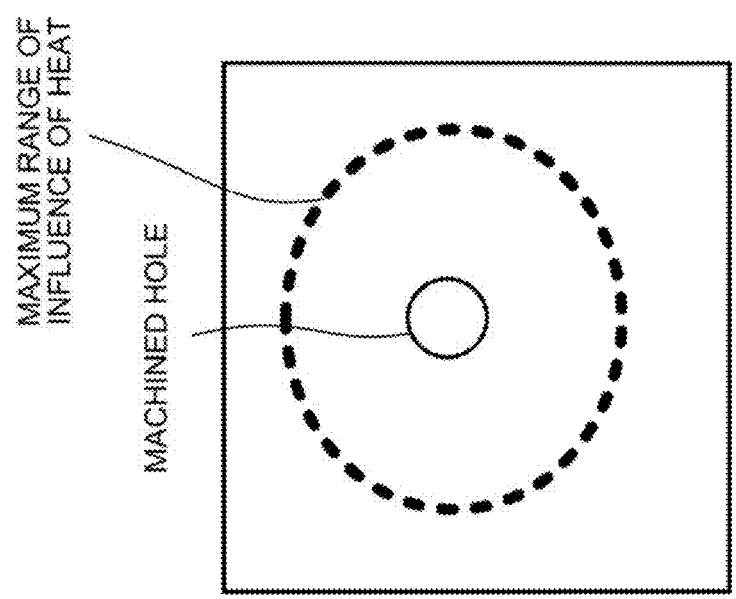
FIG. 3

NUMERICAL CONTROLLER

RELATED APPLICATION

The present application claims priority to Japanese Application Number 2018-134511 filed Jul. 17, 2018, the disclosure of which is hereby incorporated by reference herein in its entirety.

BACKGROUND OF THE INVENTION

1. Field of the Invention

The present invention relates to a numerical controller and in particular relates to a numerical controller that determines a machining position with thermal deformation taken into account.

2. Description of the Related Art

A machining machine such as a punch press and a laser machining machine for drilling a workpiece (hereinafter simply referred to as "machining machine" or "machine") is known. The temperature of the workpiece rises when a drilling process is carried out thereon using these machining machines. In particular, as illustrated in FIG. 1, when drilling processes are successively performed at positions close to each other within a certain range, thermal deformation may occur in the workpiece causing degradation in the machining accuracy. Traditionally, an operator manually determines a machining order taking into account such a possible thermal deformation (see FIG. 2) and creates a machining program (hereinafter simply referred to as "program").

Also, several schemes have been proposed to automatically determine the order of the drilling processes taking into account the prevention of thermal deformation. Japanese Patent Laid-Open No. 8-099252 discloses creation of a hole at an unmachined position farthest from the position of the previous machining so as to avoid the problem that the heat caused by friction as a result of creation of a hole concentrates at one single region and causes thermal deformation. Japanese Patent No. 5162977 discloses division of the machining area into multiple divisional regions to prevent accumulation of heat and machining proceeds in such an order that adjacent divisional regions are not consecutively subjected to the machining. Japanese Patent No. 5889606 discloses that the distance by which the machining accuracy of the next machined hole is reduced due to the influence of the heat of the previously machined hole is defined as a threshold LM and, the machining order is adjusted using a local search algorithm such as a 2-opt algorithm such that the distance between the machined holes becomes equal to or larger than the threshold LM and the machining route becomes shortest.

The traditional schemes for determining the machining order by manual operation entail the problem that an operator has to spend much time to create a program that takes the influence of the heat into account to the detriment of productivity. In particular, if machined holes having different shapes exist, the calculation and the like for determining the machining order become complicated, making it difficult to readily determine the order. In such a case, traditionally, experiences in the machining and the like are relied upon to determine the machining order, which makes it difficult for an inexperienced operator to create a machining program.

Also, the schemes disclosed in Japanese Patent Laid-Open No. 8-099252 and Japanese Patent No. 5162977 do not go beyond automation of part of the traditional rules of thumb. Since these schemes do not evaluate the influence of heat on the basis of accurate data such as actual measured values or predicted values, etc. to determine the machining position, thermal deformation may occur in some cases. Since the scheme disclosed in Japanese Patent No. 5889606 only takes into account the distance between the machined holes, it is subjected to the precondition that the machined holes have the same shape. Specifically, it cannot handle machined holes with varying shapes.

SUMMARY OF THE INVENTION

The present invention has been made to solve such a problem and an object of the present invention is to provide a numerical controller that determines the machining position with the thermal deformation taken into account.

A numerical controller according to an embodiment of the present invention is a numerical controller that machines a workpiece to create a plurality of machined holes in the workpiece, the machined holes each having a predetermined machining position and a predetermined machining shape. The numerical controller is characterized by the fact that it includes a thermal influence calculation unit, a machining position determination unit, and a machining unit. The thermal influence calculation unit is configured to determine a temporal change in a heat distribution of the workpiece for each of the machined holes. The temporal change in a heat distribution of the workpiece is a temporal change observed when the machined hole having the machining shape is created at the machining position. The machining position determination unit is configured to determine a next machined hole that does not cause thermal deformation of the workpiece, where the next machined hole being determined on the basis of an elapsed time and a heat distribution. The elapsed time is a period of time that elapses from a time at which a previously machined hole is created to another time at which a next machined hole is created and the heat distribution is observed as a result of creation of the previously machined hole and the next machined hole. The machining unit is configured to create the machined holes.

A numerical controller according to an embodiment of the present invention is characterized by the fact that the machining position determination unit determines, as the next machined hole, an unmachined hole that does not cause the thermal deformation of the workpiece and resides at a position closest to the previously machined hole.

A numerical controller according to an embodiment of the present invention is characterized by the fact that the machining position determination unit divides the workpiece into multiple regions, determines the next machined hole within one of the regions, the previously machined hole pertaining to the region, and determines the next machined hole in another of the regions when machining is completed for all of the machined holes in the region to which the previously machined hole pertains.

A numerical controller according to an embodiment of the present invention is characterized by the fact that the machining position determination unit determines a machining order for creating the machined holes such that the thermal deformation does not occur in the workpiece and a route connecting the machined holes becomes shortest.

A numerical controller according to an embodiment of the present invention is characterized by the fact that the thermal influence calculation unit determines, for each of the machined holes, a temporal change in a range where a temperature of the workpiece becomes Tt/2 when the machined hole having the machining shape is created at the machining position, the machining position determination unit determines that thermal deformation occurs in the workpiece when the range occurring in the machining of a previously machined hole overlaps with the range occurring in the machining of a next machined hole, where the temperature Tt is a temperature at which the thermal deformation occurs in the workpiece.

A numerical controller according to an embodiment of the present invention is characterized by the fact that the thermal influence calculation unit determines a temporal change in a temperature of the workpiece observed when the machined hole having the machining shape is created at the machining position, the temporal change being determined at multiple measurement points or small sections specified on the workpiece, the machining position determination unit determines that thermal deformation occurs in the workpiece at either of the measurement point and the small section when a total value of an amount of heat generated by machining of a previously machined hole and an amount of heat generated by machining of a next machined hole exceeds Tt, where the temperature Tt is a temperature at which the thermal deformation occurs in the workpiece.

A numerical controller according to an embodiment of the present invention is characterized by the fact that the thermal influence calculation unit determines the heat distribution by an approximate calculation scheme including a finite element method.

A numerical controller according to an embodiment of the present invention is characterized by the fact that the thermal influence calculation unit determines the heat distribution using a data set of measurement of the heat distribution at the time of sample machining.

A numerical controller according to an embodiment of the present invention is characterized by the fact that the machining unit generates a machining program for forming the machined holes according to an order determined by the machining position determination unit.

According to the present invention, it is made possible to provide a numerical controller that determines the machining position with the thermal deformation taken into account.

BRIEF DESCRIPTION OF THE DRAWINGS

The above-described and other objects and features of the present invention will be apparent from the following description of embodiments with reference to the accompanying drawings, in which:

FIG. 3 is a diagram illustrating an example of a machined hole and a maximum range of influence of heat;

DETAILED DESCRIPTION OF THE PREFERRED EMBODIMENTS

First Embodiment

A numerical controller 1 according to a first embodiment of the present invention takes thermal conductivity of a workpiece into account to determine a machining position (i.e., a position at which a machined hole is to be created) that is not affected by heat. Also, the numerical controller 1 is capable of determining machining order (i.e., an order of machining according to which the machining is to proceed) that is not affected by heat. Further, the numerical controller 1 is capable of automatically generating a machining program that is not affected by heat.

Figure 15:
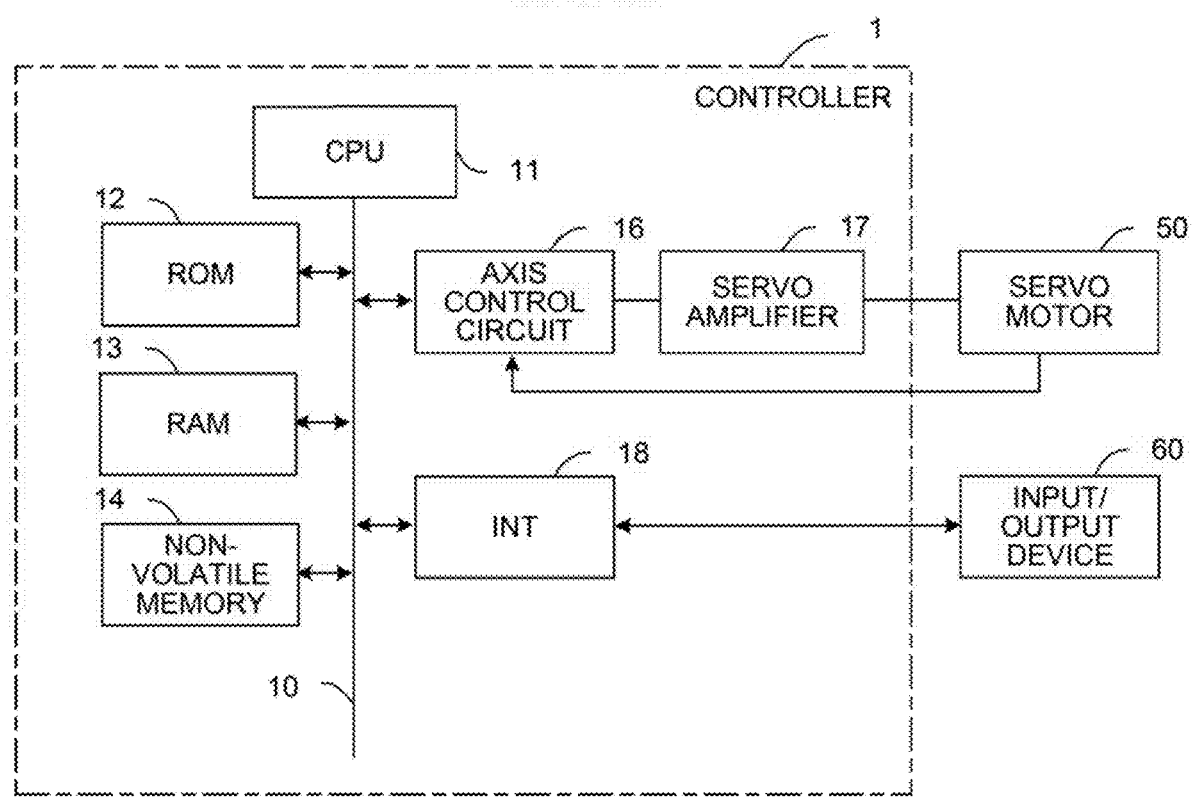
FIG. 15 is a diagram illustrating an example of a hardware configuration of the numerical controller.

FIG. 15 is a hardware configuration diagram that illustrates main features of the numerical controller 1. The numerical controller 1 is a device that controls a machining machine. The numerical controller 1 includes a CPU 11, a ROM 12, a RAM 13, a non-volatile memory 14, an interface 18, a bus 10, an axis control circuit 16, and a servo amplifier 17. Also, a servo motor 50 and an input and output device 60 are connected to the numerical controller 1.

The CPU 11 is a processor that controls the entire numerical controller 1. The CPU 11 reads a system program stored in the ROM 12 via a bus 10 and controls the entire numerical controller 1 according to the system program.

The ROM 12 stores a system program for implementing various controls and the like of the machining machine. The system program is stored in the ROM 12 prior to the implementation of the intended control and the like.

The RAM 13 is configured to temporarily store temporary calculation data, data to be displayed, data entered by an operator using an input and output device 60 which will be described later, programs, and the like.

The non-volatile memory 14 may be backed up by a not-shown battery and maintains its state of storage while the power supply to the numerical controller 1 is stopped. The non-volatile memory 14 is configured to store data entered from the input and output device 60, programs, and the like. The programs and data stored in the non-volatile memory 14 may be deployed onto the RAM 13 when they are run or used.

The axis control circuit 16 is configured to control a motion axis of the machining machine. The axis control circuit 16 is configured to receive an axis movement command amount output by the CPU 11 and output an axis movement command to the servo amplifier 17 according to the movement amount.

The servo amplifier 17 is configured to receive the axis movement command output by the axis control circuit 16 and drive the servo motor 50.

The servo motor 50 is driven by the servo amplifier 17 to move the motion axis of the machining machine. The servo motor 50 typically incorporates a position and speed detector. The position and speed detector outputs a position and speed feedback signal, the signal is fed back to the axis control circuit 16, and thus feedback control of position and speed is realized.

It should be noted that, although FIG. 15 only illustrates one single axis control circuit 16, one single servo amplifier 17, and one single servo motor 50, they will be provided in practice by the number corresponding to the number of the axes that the machining machine (not shown) to be controlled has. For example, when a machining machine with three axes is to be controlled, three sets of components each including one axis control circuit 16, one servo amplifier 17, and one servo motor 50 will be provided so that each of the sets of components corresponds to a corresponding one of the axes.

The input and output device 60 is a data input and output device that includes a display unit, a hardware key, etc. and is typically a control panel. The input and output device 60 is configured to display information received from the CPU 11 via the interface 18. The input and output device 60 delivers the command, data, and the like entered by the hardware key or the like to the CPU 11 via the interface 18. According to the input and output device 60, for example, a program stored in the non-volatile memory 14 can be displayed on the display unit to edit it using the hardware key.

Figure 16:
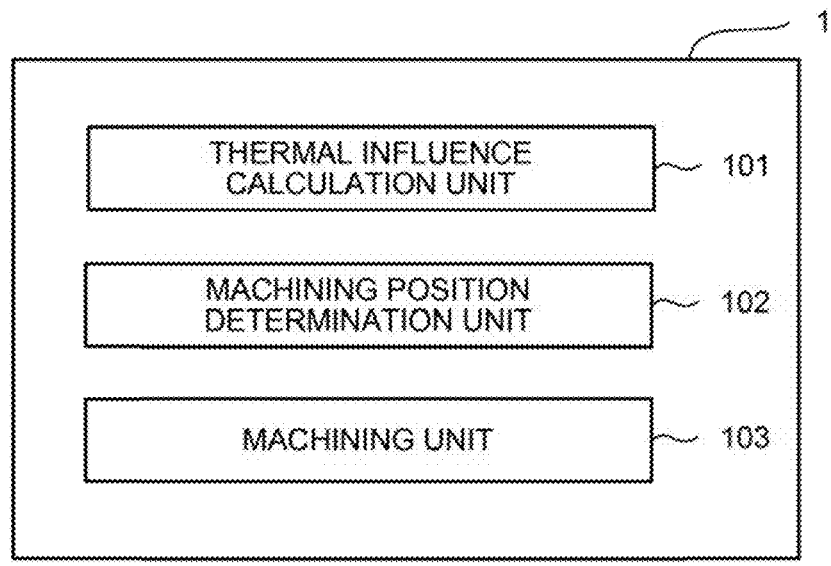
FIG. 16 is a diagram illustrating an example of the functional configuration of the numerical controller.

FIG. 16 is a block diagram that illustrates a schematic functional configuration of the numerical controller 1. The numerical controller 1 includes a thermal influence calculation unit 101, a machining position determination unit 102, and a machining unit 103.

The thermal influence calculation unit 101 is configured to compute, for each machined hole described in the machining program, a distribution of heat generated when the machining is performed. Here, the machined holes each have a machining position (e.g., the center of the machined hole, etc.) and a machining shape (i.e. the shape of the machined hole). In other words, in this embodiment, the machined holes may have different shapes.

Figure 17:
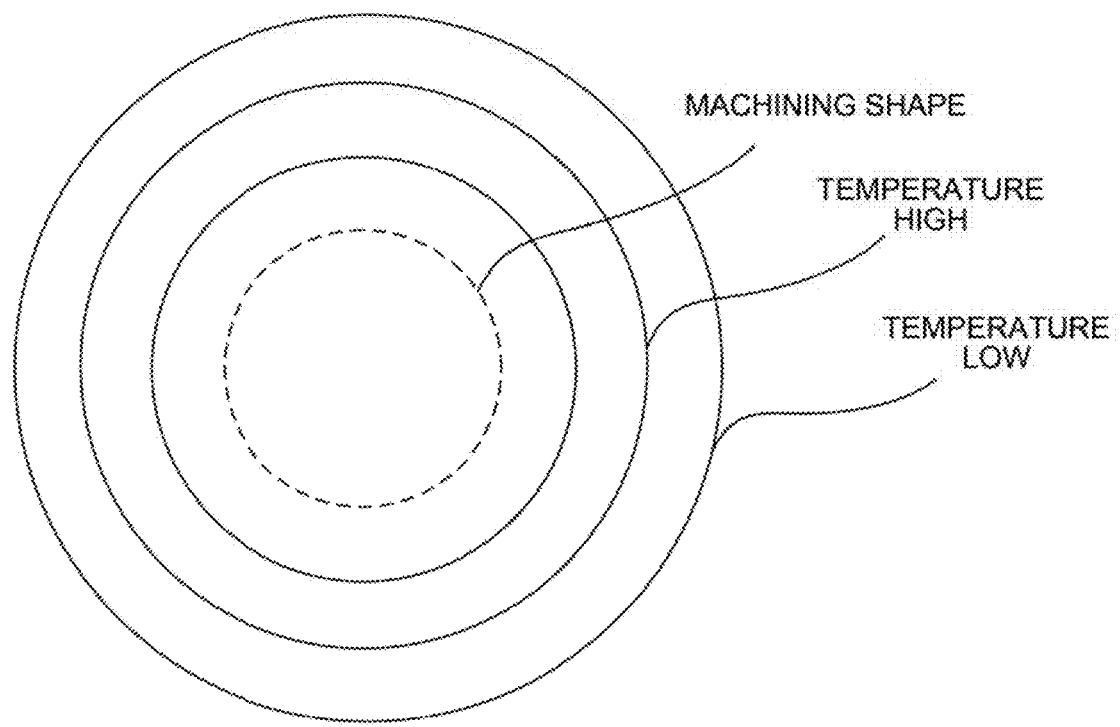
FIG. 17 is a diagram illustrating an example of heat distribution of the workpiece resulting from the drilling process.
Figure 18:
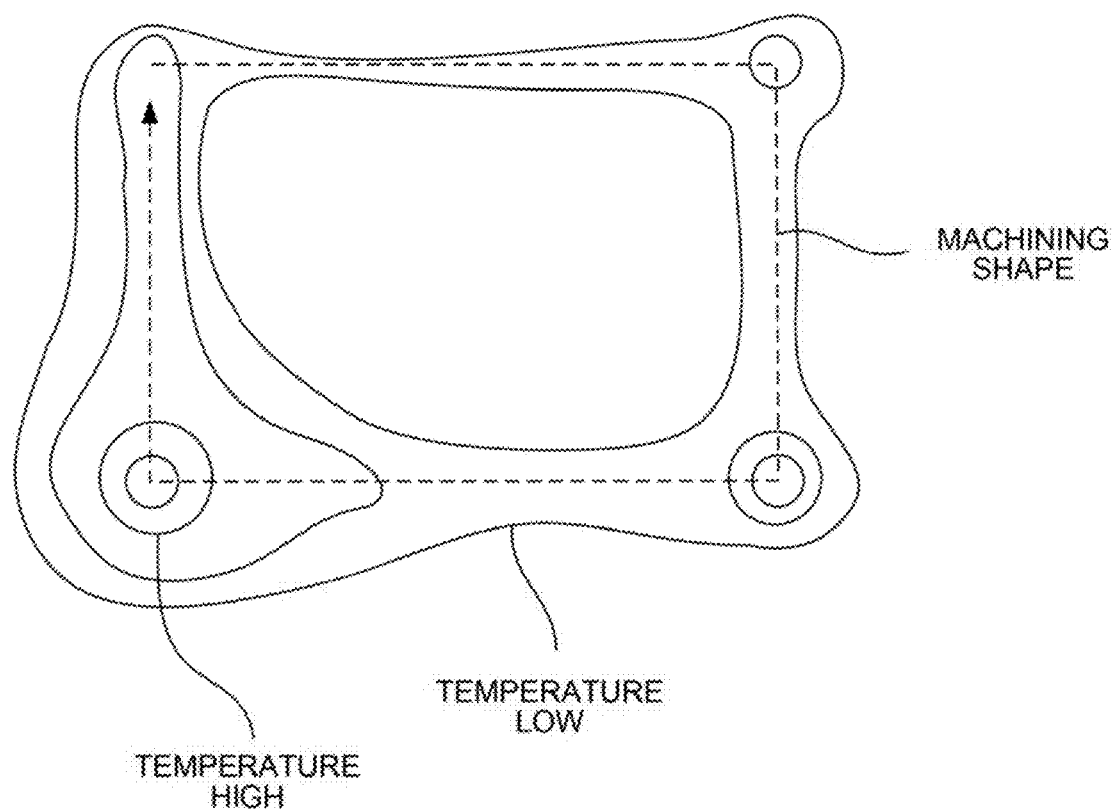
FIG. 18 is a diagram illustrating an example of the heat distribution of the workpiece resulting from the drilling process.

FIGS. 17 and 18 are diagrams that illustrate an example of the heat distribution (temperature distribution) of the workpiece resulting from a drilling process. The broken line represents the machining shape. The closed figures drawn by the solid line are isothermal lines connecting points having the same temperature such that an inner isothermal line has a higher temperature than an outer isothermal line. FIG. 17 illustrates the heat distribution in a case where a round hole is to be created by a punch press. Heat is distributed concentrically about the center of the round hole (machining position). FIG. 18 illustrates the heat distribution in a case where a rectangular hole is to be created by laser machining. In contrast to the case of the round hole, a distorted (uneven) heat distribution is observed in which heat concentrates at the corner sections.

Also, the thermal influence calculation unit 101 is capable of computing a maximum range of influence of heat for each machined hole. The maximum range of influence of heat refers to a range where heat generated when the drilling process is performed propagates to such an extent that the machining accuracy of the next machining may be affected. In this embodiment, the lower limit of the temperature at which thermal deformation may occur in the workpiece (i.e., the temperature at which the thermal deformation begins to occur) is given as temperature Tt, and the maximum range of influence of heat is defined as the range where the workpiece temperature becomes equal to or higher than Tt/2 degrees as a result of the machining. FIG. 3 shows an example of the machined hole and the maximum range of influence of heat. It shows that different shapes of the machined hole lead to different maximum ranges of influence of heat.

Figure 5:
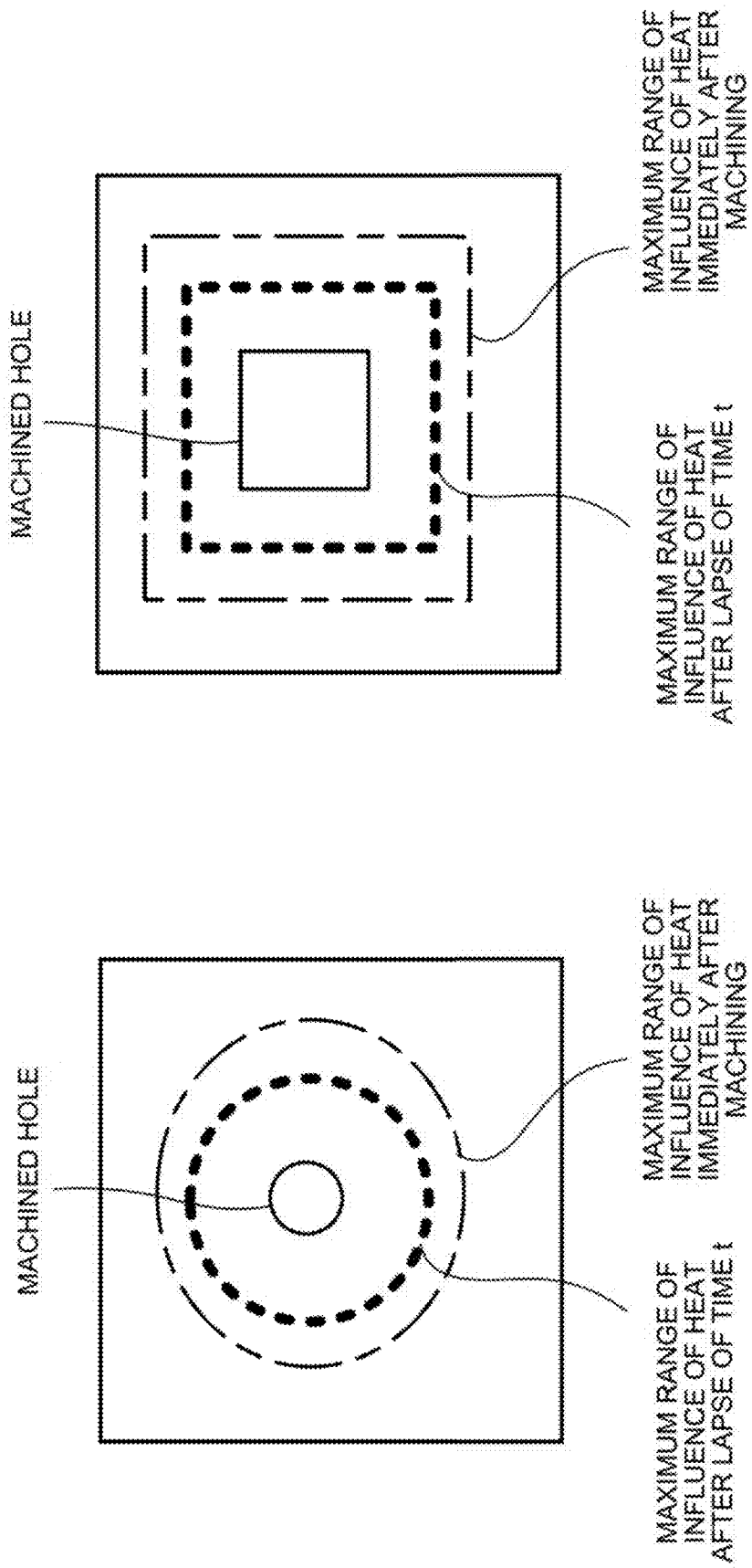
FIG. 5 is a diagram illustrating an example of heat distribution calculation by a finite element method.

While the heat generated as a result of the machining is substantially instantaneously propagates to a predetermined range in the workpiece immediately after the machining, the heat is gradually dissipated over time, so that the heat distribution will exhibit such a temporal change that the range enclosed by the isothermal line shrinks. As illustrated in FIG. 5, the maximum range of influence of heat of the workpiece after the machining is largest immediately after the machining but shrinks over time through dissipation. Specifically, after the machining, while a tool is moved by fast forward to a next machining position, the maximum range of influence of heat shrinks with the passage of a traveling time. In other words, the heat distribution of the workpiece after the machining or the maximum range of influence of heat is expressed as a function of time.

Four examples of the scheme for calculation of the heat distribution by the thermal influence calculation unit 101 will be described below.

First Scheme for Calculation of the Heat Distribution

The thermal influence calculation unit 101 is capable of sequentially calculating the heat distributions when the machining is performed on the respective machined holes using, for example, a known scheme that can calculate the heat distributions, an example of which is a finite element method. In this case, various constants, eigenvalues, etc. necessary for the calculation are determined or identified in advance of the actual calculation, and are stored in a predetermined storage area.

Figure 1:
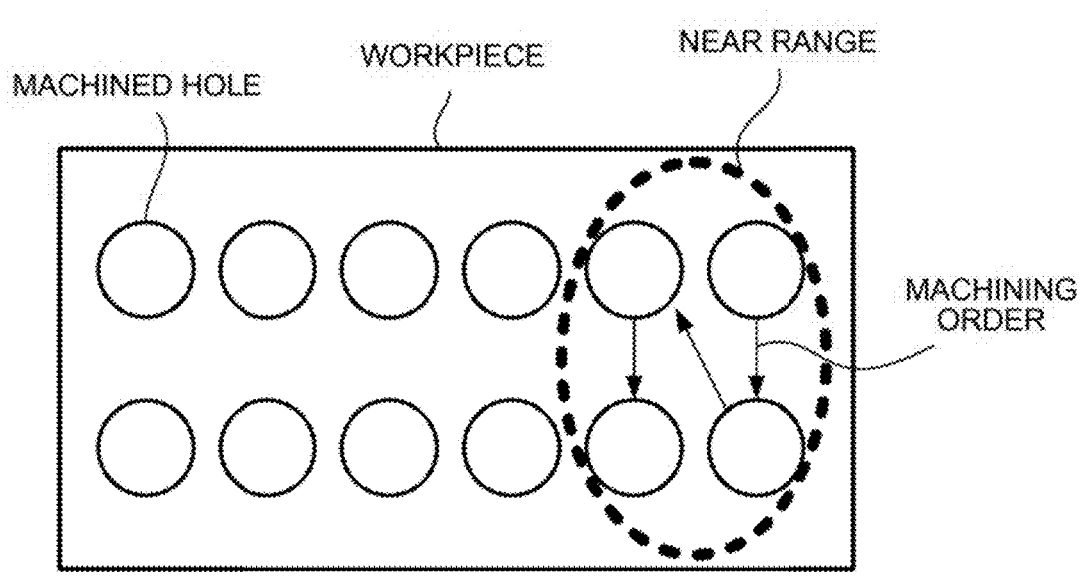
FIG. 1 is a diagram for explanation of a problem to be addressed in a drilling process.
Figure 2:
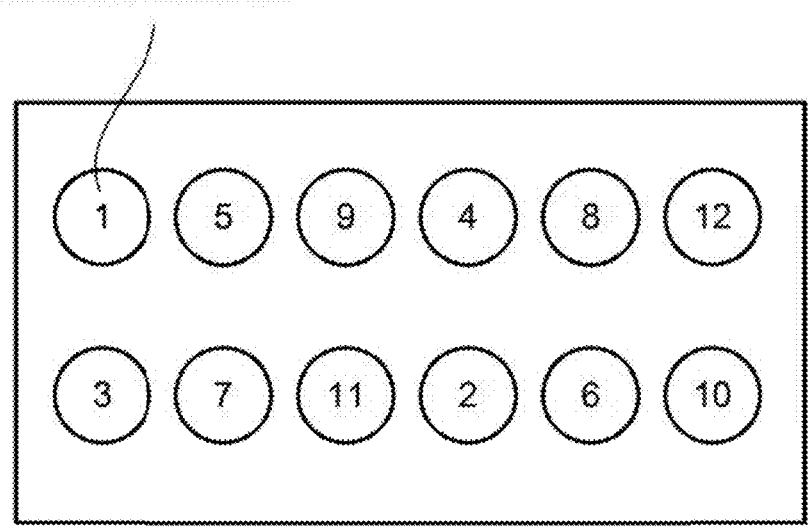
FIG. 2 is a diagram for explanation of a problem to be addressed in a drilling process.
Figure 4:
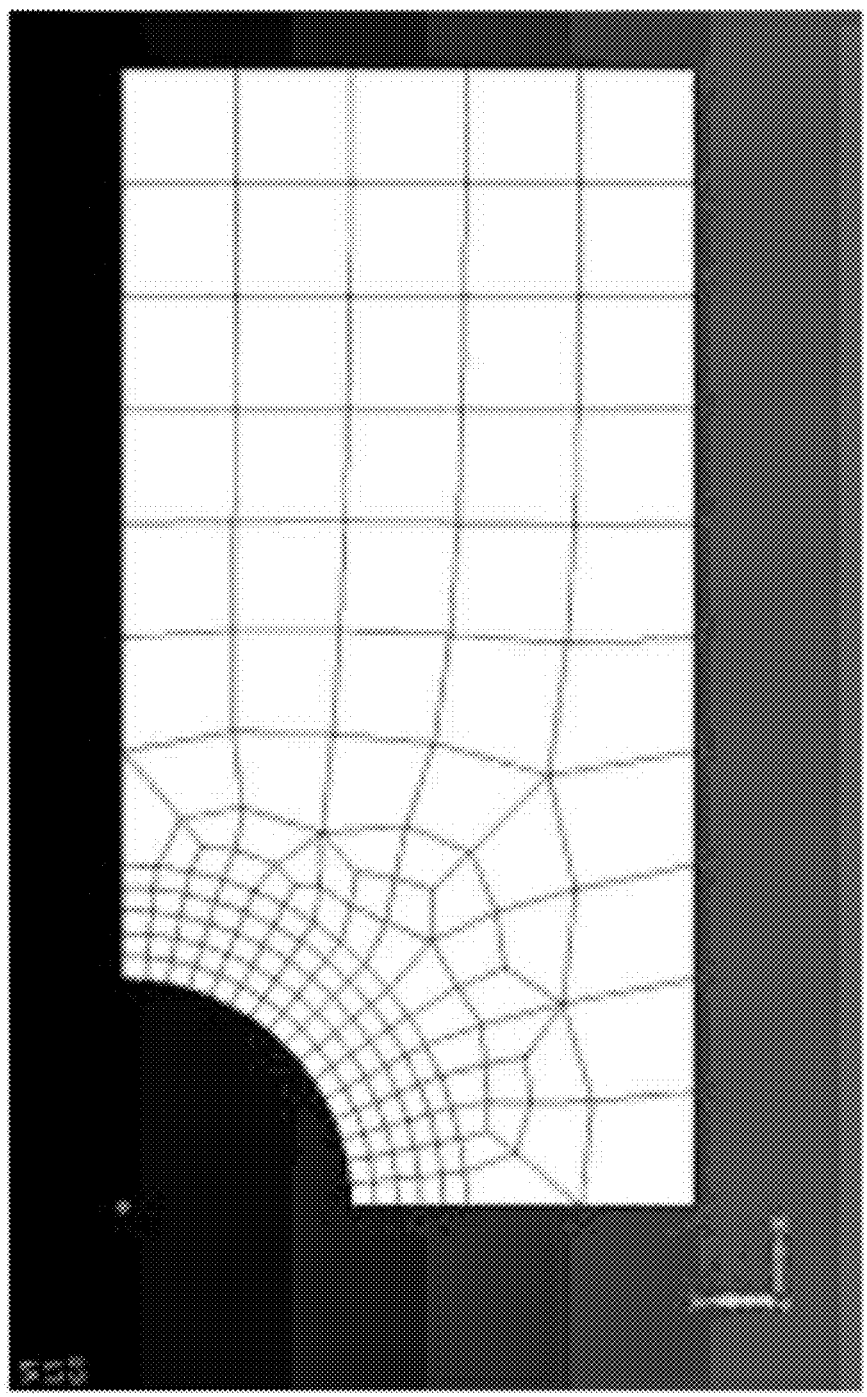
FIG. 4 is a diagram illustrating a temporal change in the maximum range of influence of heat.

A finite element method is a method of discretization for approximating a solution to a problem describing a phenomenon as a differential equation or partial differential equation that is difficult to solve analytically. An object that has a complex shape or complex properties is divided into simple small sections (see FIG. 4), the behaviors are calculated for the respective small sections, and the behavior of the object as a whole is predicted based thereon.

The thermal influence calculation unit 101 combines, for example, the following heat conduction equation with the finite element method. Specifically, by calculating the heat conduction equation for the respective small sections, the temperatures of the individual small sections at a certain time and the heat distribution of the workpiece as a whole are identified.

$$C_v \frac{\partial T}{\partial t} + \lambda \Delta T = q(t), \Delta = \frac{d^2}{dx^2} + \frac{d^2}{dy^2} + \frac{d^2}{zd^2} \quad \text{[Math 1]}$$

where
  Cv is a product of specific heat and density (J/m³),
  T is the temperature (K),
  t is the time (sec),
  λ is the thermal conductivity (J/(m·sec·K)), and
  q(t) is a heat input per unit time and unit volume (laser irradiation heat, friction heat of punch, etc.) (J/sec·m³).

Here, Cv and λ are constants that vary depending on the workpiece materials and q(t) is a value unique to a laser oscillator, etc. The thermal influence calculation unit 101 is capable of calculating a workpiece temperature at the respective small sections at the elapsed time t that has elapsed since the machining by performing this calculation for the respective small sections.

Second Scheme for Calculation of the Heat Distribution

The thermal influence calculation unit 101 can determine the maximum range of influence of heat by putting together the small sections (or a representative point thereof) the workpiece temperature at which becomes equal to or higher than Tt/2 at the elapsed time t according to the first scheme for calculation of the heat distribution. By using this maximum range of influence of heat as will be described later, it is made possible to determine the eligibility of a machining position at a high speed using a small amount of resources.

Third Scheme for Calculation of the Heat Distribution

According to the above-described first scheme for calculation of the heat distribution, it is possible to calculate the heat distribution for a workpiece with any appropriate shape, any appropriate workpiece material, any appropriate machining shape, etc., but this requires a considerable amount of calculation resources. According to the second scheme for calculation of the heat distribution, the thermal influence calculation unit 101 accumulates the results of calculation determined by the first scheme for calculation of the heat distribution in a database. More specifically, the workpiece temperatures at the elapsed time "t" that has elapsed since the machining in the respective small section are stored in the database, for example, for each workpiece shape, machining shape, and constants such as Cv, λ, and q(t).

At and after the next round of machining, when the machining should be performed again under the same or similar condition, the thermal influence calculation unit 101 can determine, by referring to this database, the workpiece temperature in each small section at the elapsed time "t" that has elapsed since the machining. Also, the thermal influence calculation unit 101 can determine the maximum range of influence of heat by putting together the small sections (or a representative value thereof) the workpiece temperature at which becomes equal to or higher than Tt/2 at the elapsed time t.

Fourth Scheme for Calculation of the Heat Distribution

The thermal influence calculation unit 101 can also identify the heat distribution in the case where the machining of the respective machined holes is performed by actually performing sample machining and referring to the results of the measurement of the temperature of the workpiece using a temperature measurement scheme such as thermography. For example, a temperature of a workpiece in a case where a drilling process is performed on a certain workpiece with a certain machining shape is measured at multiple measurement points for each predetermined period of time, and the results of measurement are transformed into a database or a mathematical expression (or any other suitable process is performed in the results of the measurement) and thus accumulated. More specifically, for example, for the respective workpiece shapes, machining shapes, and constants such as Cv, λ, and q(t), the distance from the machining position and the elapsed time that has elapsed since the machining, and the workpiece temperatures are accumulated in a database in association with each other.

The thermal influence calculation unit 101 can determine the workpiece temperature at the elapsed time "t" that has elapsed since the machining at each measurement point by referring to this database. Also, the thermal influence calculation unit 101 can determine the maximum range of influence of heat (or the closed figure indicative of the outer edge thereof) by interconnecting the measurement points at which the workpiece temperature at the elapsed time t becomes Tt/2.

The machining position determination unit 102 determines the next machining position on the basis of the heat distribution or the maximum range of influence of heat calculated by the thermal influence calculation unit 101 and the traveling time to reach the next machining position. Here, the traveling time refers to the elapsed time that has elapsed from the time point at which the machining of the machined hole at the previous machining position was performed to the time point at which the machining of the machined hole is started at the next machining position.

First Scheme for Determining the Machining Position

The machining position determination unit 102 can find out the nearest unmachined position that is not susceptible to the influence of the heat generated in the previous round of machining by using the maximum range of influence of heat determined by the above-described second scheme for calculation of the heat distribution. According to this scheme, the eligibility of the machining position is determined by using geometrical information, i.e., the maximum range of influence of heat. This scheme only requires simper calculation than the second to fourth schemes for determining the machining position, which will be described later, and can determined the machining position at a high speed with a less amount of calculation resources.

Step 1. The traveling time t from the previous machining position to the unmachined position P is computed. Specifically, it is assumed here that the machining is to be performed at the unmachined position P after the lapse of the traveling time t from the previous machining position. The initial value of the unmachined position P is by definition the unmachined position that is nearest from the previous machining position.

Step 2. The maximum range of influence of heat A1(*t*) in the machining of the previous round after the lapse of the traveling time t since the previous round of the machining is determined by the second scheme for calculation of the heat distribution.

Step 3. The maximum range of influence of heat A2(*t*) immediately after the machining as a result of the machining having been performed on the unmachined position P at the time at which the traveling time t has elapsed is determined by the second scheme for calculation of the heat distribution.

Figure 6:
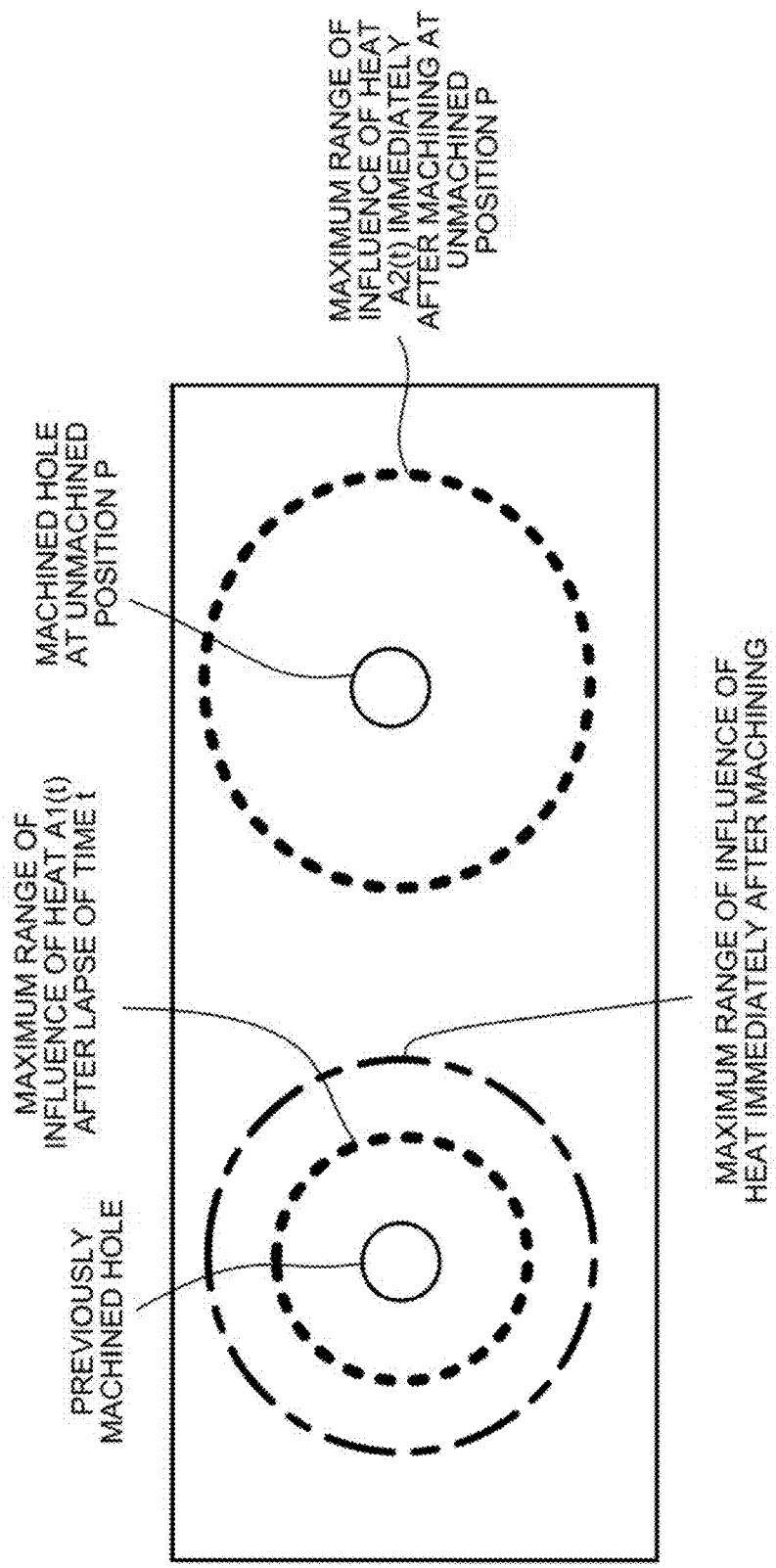
FIG. 6 is a diagram illustrating an example of a scheme for determination of a machining position according to a first embodiment.
Figure 7:
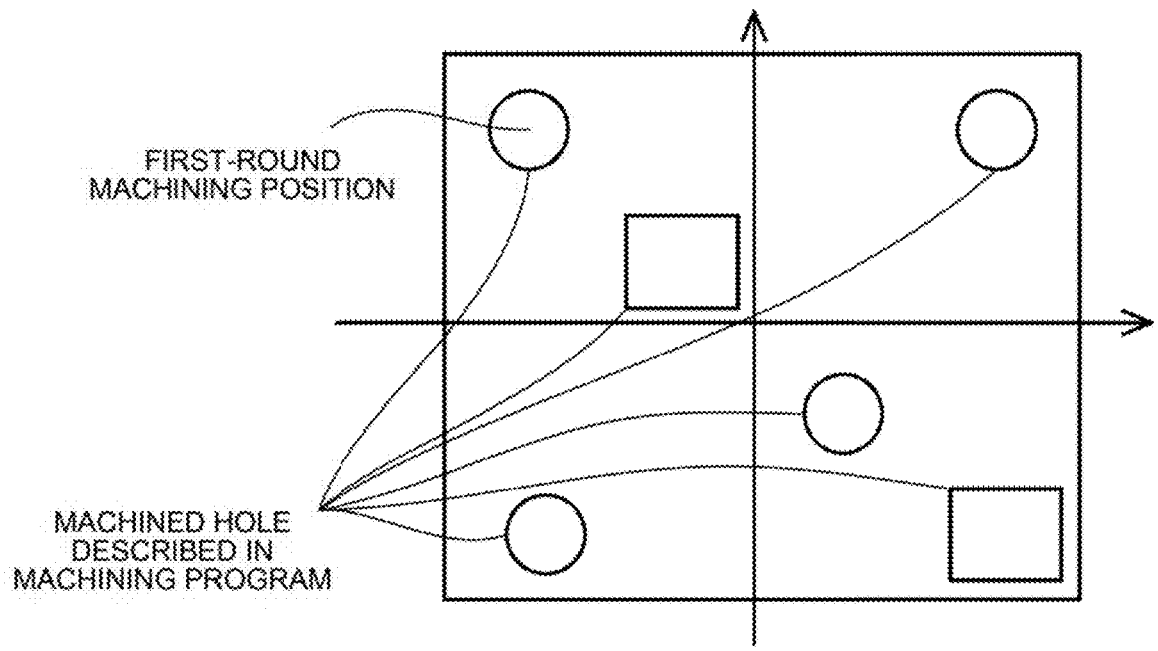
FIG. 7 is a diagram illustrating an example of the scheme for determination of the machining position according to the first embodiment.

Step 4. It is determined whether or not A1(*t*) and A2(*t*) interfere with each other, i.e., partly overlap with each other. If they interfere with each other, the process proceeds to the step 6. In this case, since there exists a region where the workpiece temperature is equal to or higher than Tt, the unmachined position P will not be suitable as the next machining position (there is a risk that thermal deformation may occur). If they do not interfere with each other (see FIG. 6), the process proceeds to the step 5.

Step 5. The unmachined position P is determined as the next machining position.

Step 6. The unmachined position P is updated by the unmachined position that is not so close to the previous machining position as the unmachined position P but the second closest to the previous machining position, and the calculation at and after the step 1 is repeated.

Second Scheme for Determining the Machining Position

The machining position determination unit 102 can find out the nearest unmachined position that is not affected by the influence of the heat that occurred in the previous round of machining by using the heat distribution computed by the above-described first scheme for calculation of the heat distribution. It is possible to search for the unmachined position more precisely than the first scheme for determining the machining position described above.

Step 1. The traveling time from the previous machining position of an unmachined position P is computed. Specifically, it is assumed here that the machining is to be performed at the unmachined position P after the lapse of the traveling time t from the previous machining position. The initial value of the unmachined position P is by definition the unmachined position that is nearest from the previous machining position.

Step 2. The heat distribution of the workpiece after the lapse of the traveling time t since the previous round of the machining is determined by the first scheme for calculation of the heat distribution. Specifically, the temperature of the workpiece at the multiple small sections specified on the workpiece after the lapse of the traveling time t since the previous round of the machining is determined.

Step 3. The heat distribution immediately after the machining as a result of the machining having been performed at the unmachined position P at the time point at which the traveling time t elapsed is determined by the first scheme for calculation of the heat distribution. Specifically, the temperature of the workpiece at the multiple small sections specified on the workpiece immediately after the machining at the unmachined position P is determined.

Step 4. The temperature that has been determined in the step 1 (resulting from the previous round of the machining) and the temperature that has been determined in the step 2 (resulting from the machining at the unmachined position P) at the respective measurement points on the workpiece are combined and it is determined whether or not there exists any small section where the total temperature becomes equal to or higher than Tt. If it exists, then the process proceeds to the step 6. In this case, since there exists a region where the workpiece temperature is equal to or higher than Tt, the unmachined position P will not be suitable as the next machining position (there is a risk that thermal deformation may occur). If it does not exist, then the process proceeds to the step 5.

Step 5. The unmachined position P is determined as the next machining position.

Step 6. The unmachined position P is updated by the unmachined position that is not so close to the previous machining position as the unmachined position P but the second closest to the previous machining position, and the calculation at and after the step 1 is repeated.

Third Scheme for Determining the Machining Position

The machining position determination unit 102 can find out the nearest unmachined position that is not affected by the influence of the heat that occurred in the previous round of the machining using the heat distributions predicted and accumulated by the above-described third scheme for calculation of the heat distribution. By reuse, if it can be so described, of the temperature distribution that has been calculated under a similar condition, it is made possible to reduce the amount of calculation while maintaining the accuracy comparable to that of the above-described second scheme for determining the machining position.

Step 1. The traveling time from the previous machining position of an unmachined position P is computed. Specifically, it is assumed here that the machining is to be performed at the unmachined position P after the lapse of the traveling time t from the previous machining position. The initial value of the unmachined position P is by definition the unmachined position that is nearest from the previous machining position.

Step 2. The heat distribution of the workpiece after the lapse of the traveling time t since the previous round of the machining is determined by the third scheme for calculation of the heat distribution. Specifically, after the lapse of the traveling time t since the previous round of the machining, the temperature of the workpiece is determined at multiple measurement points specified on the workpiece.

Step 3. The heat distribution immediately after the machining as a result of the machining having been performed at the unmachined position P at the time point at which the traveling time t elapsed is determined by the third scheme for calculation of the heat distribution. Specifically, the temperature of the workpiece at multiple measurement points specified on the workpiece immediately after the machining at the unmachined position P is determined.

Step 4. The temperature that has been determined in the step 1 (resulting from the previous round of the machining) and the temperature that has been determined in the step 2 (resulting from the machining at the unmachined position P) at the respective measurement points on the workpiece are combined, and it is determined whether or not there exists any measurement point where the total temperature becomes equal to or higher than Tt. If it exists, then the process proceeds to the step 6. In this case, since there exists a region where the workpiece temperature is equal to or higher than Tt, the unmachined position P will not be suitable as the next machining position (there is a risk that thermal deformation may occur). If it does not exist, then the process proceeds to the step 5.

Step 5. The unmachined position P is determined as the next machining position.

Step 6. The unmachined position P is updated by the unmachined position that is not so close to the previous machining position as the unmachined position P but the second closest to the previous machining position, and the calculation at and after the step 1 is repeated.

Fourth Scheme for Determining the Machining Position

The machining position determination unit 102 can find out the nearest unmachined position that is not affected by the influence of the heat that occurred in the previous round of the machining using the heat distributions actually measured and accumulated by the above-described fourth scheme for calculation of the heat distribution. By reuse, if it can be so described, of the temperature distribution actually measured under a similar condition, it is made possible to eliminate the amount of calculation associated with the predicted values while maintaining the accuracy comparable to that of the above-described second and third schemes for determining the machining position.

Step 1. The traveling time from the previous machining position to an unmachined position P is computed. Specifically, it is assumed here that the machining is to be performed at the unmachined position P after the lapse of the traveling time t from the previous machining position. The initial value of the unmachined position P is by definition the unmachined position that is nearest from the previous machining position.

Step 2. The heat distribution of the workpiece after the lapse of the traveling time t since the previous round of the machining is determined by the fourth scheme for calculation of the heat distribution. Specifically, the temperature of the workpiece at multiple measurement points specified on the workpiece after the lapse of the traveling time t since the previous round of the machining is determined.

Step 3. The heat distribution immediately after the machining as a result of the machining having been performed at the unmachined position P at the time point at which the traveling time t elapsed is determined by the fourth scheme for calculation of the heat distribution. Specifically, the temperature of the workpiece at multiple measurement points specified on the workpiece immediately after the machining at the unmachined position P is determined.

Step 4. The temperature that has been determined in the step 1 (resulting from the previous round of the machining) and the temperature that has been determined in the step 2 (resulting from the machining at the unmachined position P) at the respective measurement points on the workpiece are combined and it is determined whether or not there exists any measurement point where the total temperature becomes equal to or higher than Tt. If it exists, then the process proceeds to the step 6. In this case, since there exists a region where the workpiece temperature is equal to or higher than Tt, the unmachined position P will not be suitable as the next machining position (there is a risk that thermal deformation may occur). If it does not exist, then the process proceeds to the step 5.

Step 5. The unmachined position P is determined as the next machining position.

Step 6. The unmachined position P is updated by the unmachined position that is not so close to the previous machining position as the unmachined position P but the second closest to the previous machining position, and the calculation at and after the step 1 is repeated.

When the next machining position has been determined by the machining position determination unit 102, the machining unit 103 carries out the drilling process at the machining position.

An example of the operation of the numerical controller 1 will be described below based on the flowchart of FIG. 11 and with reference to FIGS. 7 to 10. The numbers assigned to the individual steps in the following processes correspond to the flowchart of FIG. 11.

S1: The thermal influence calculation unit 101 reads the machining program and acquires the machining positions and machining shapes of all the machined holes. For each machined hole, the heat distribution observed when the machining is performed is calculated or acquired using the above-described first or second scheme for calculation of the heat distribution. Also, the thermal influence calculation unit 101 may compute the maximum range of influence of heat.

S2: The machining position determination unit 102 determines a first-round machining position as appropriate (see FIG. 7). Typically, the first-round machining position is specified by a user. The machining unit 103 performs the drilling process at the first-round machining position that has been determined.

S3: The machining position determination unit 102 selects the unmachined position P closest to the first-round machining position.

S4: The machining position determination unit 102 determines whether or not thermal deformation may occur when the machining is performed at the unmachined position P according to the procedure of the steps 2 to 4 of any one of the above-described first to third schemes for determining the machining position. If thermal deformation may occur, the process proceeds to the step S7. If no thermal deformation occurs, the process proceeds to the step S5.

Figure 8:
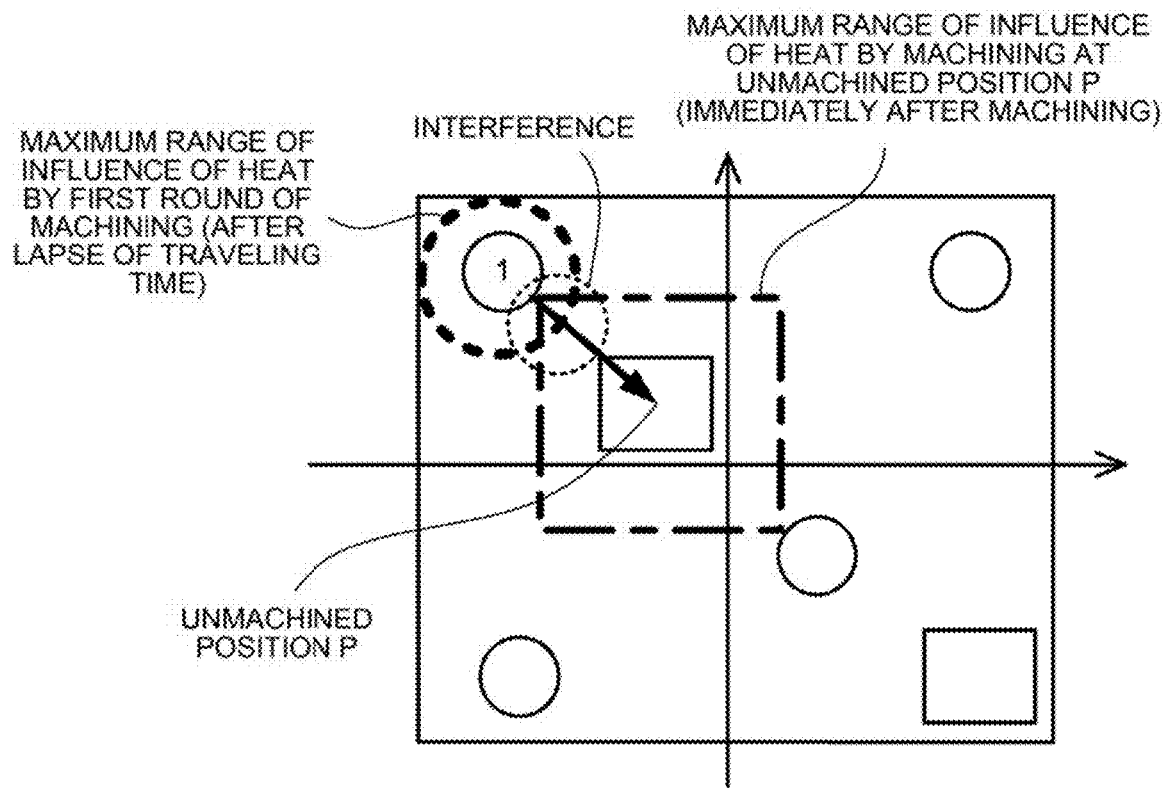
FIG. 8 is a diagram illustrating an example of the scheme for determination of the machining position according to the first embodiment.
Figure 9:
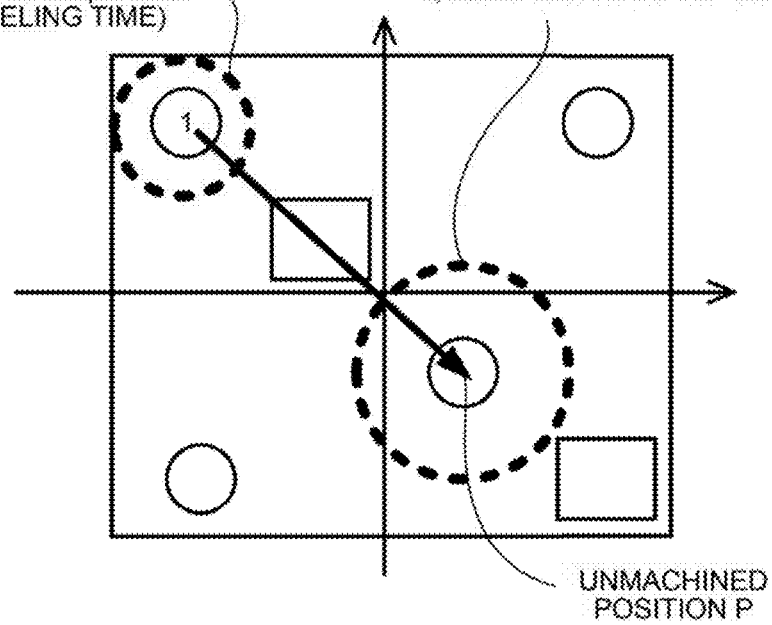
FIG. 9 is a diagram illustrating an example of the scheme for determination of the machining position according to the first embodiment.

FIGS. 8 and 9 are schematic diagrams that illustrate an example of the process for the machining position determination unit 102 to determine the presence or absence of thermal deformation after the first round of machining according to the first scheme for determining the machining position. The machining position determination unit 102 determines that thermal deformation may occur if the maximum range of influence of heat as a result of the first round of machining interferes with the maximum range of influence of heat when the machining is performed at the unmachined position P. FIG. 8 illustrates an example where interference of the maximum ranges of thermal influence occurs at the unmachined position P closest to the first-round machining position. FIG. 9 illustrates an example where interference of the maximum ranges of thermal influence does not occur at the unmachined position P second closest to the first-round machining position.

Figure 10:
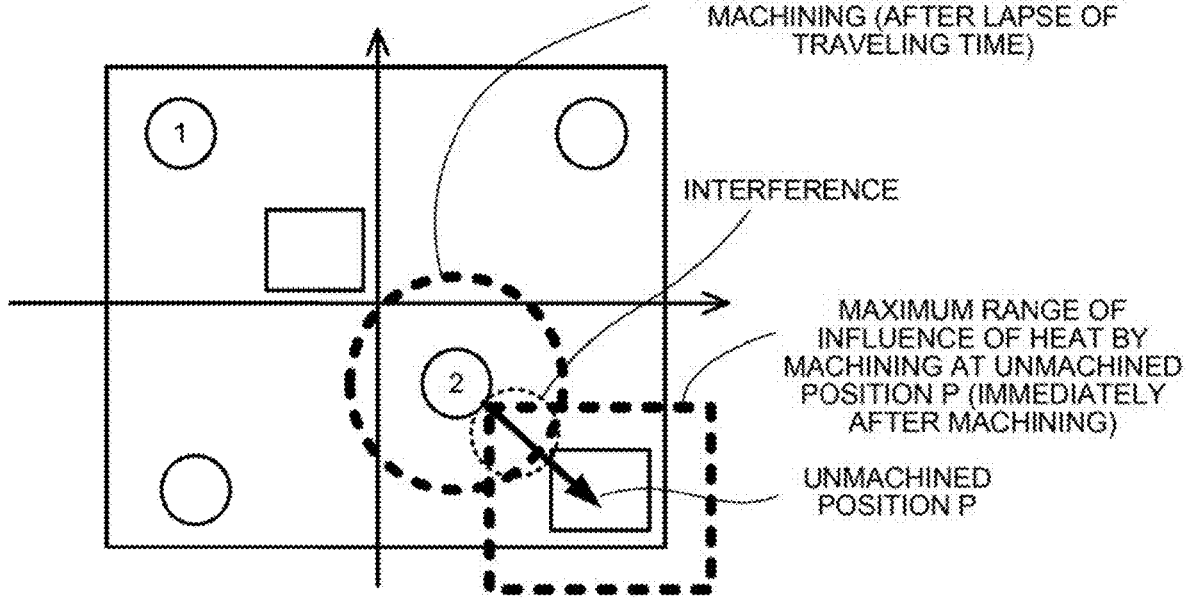
FIG. 10 is a diagram illustrating an example of the scheme for determination of the machining position according to the first embodiment.

FIG. 10 is a schematic diagram that illustrates an example of the process for the machining position determination unit 102 to determine the presence or absence of thermal deformation after the machining is performed at the second-round machining position according to the first scheme for determining the machining position. The machining position determination unit 102 determines that thermal deformation may occur if the maximum range of influence of heat as a result of the second round of machining interferes with the maximum range of influence of heat when the machining is performed at the unmachined position P. In the example illustrated in FIG. 10, it is determined that the interference of the maximum ranges of thermal influence occurs at the unmachined position P closest to the second-round machining position.

S5: The machining unit 103 performs the drilling process at the unmachined position P determined in the step S4.

S6: When there is any other unmachined position remaining, the process proceeds to the step S7. When no unmachined position exists, the process proceeds to the step S8.

S7: After the step S4, the unmachined position that is closest to the previous machining position other than the current unmachined position P is selected as a new unmachined position P and the process goes back to the step S4.

Alternatively, after the step S6, the unmachined position closest to the current unmachined position P (i.e., the machining position in the step S5) is selected as a new unmachined position P and the process proceeds to the step S4.

S8: The machining is completed.

According to this embodiment, when the machining program is registered in the numerical controller 1, the drilling process can be performed in the optimum machining order with the thermal deformation taken into account by the numerical controller 1. By virtue of this, it is made possible to considerably shorten the time traditionally needed for an operator to create a machining program taking into account the thermal deformation. Also, it is made possible for an inexperienced operator to carry out the drilling process taking into account the thermal deformation. Hence, efficiency of the tasks and productivity can be improved.

Second Embodiment

Figure 11:
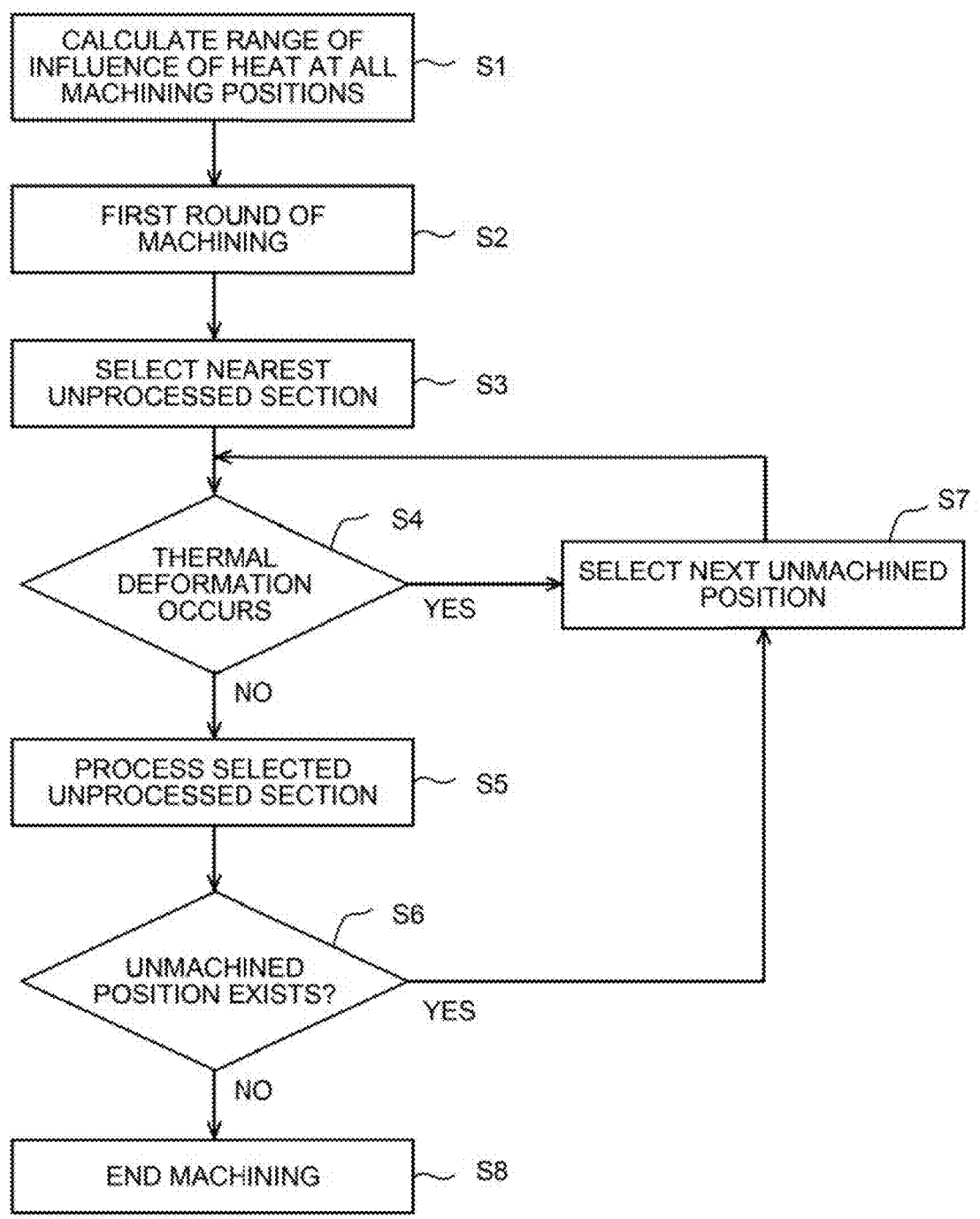
FIG. 11 is a flowchart illustrating an example of the operation of a numerical controller 1 according to the first embodiment.
Figure 12:
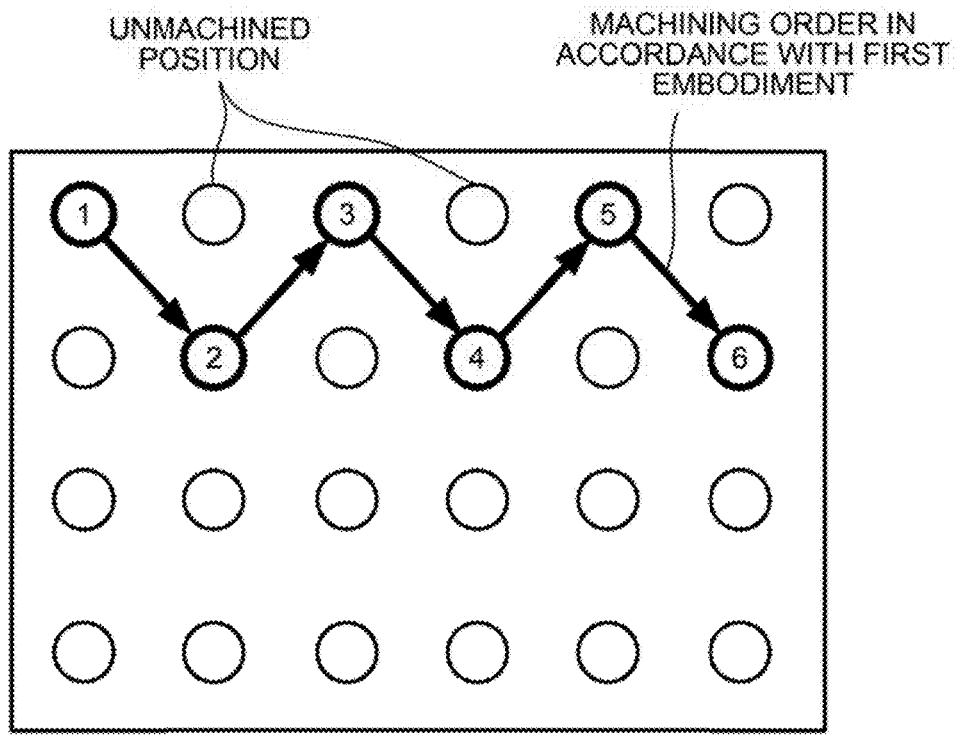
FIG. 12 is a diagram illustrating an example of a scheme for determination of a machining position according to a second embodiment.

When the numerical controller 1 according to the first embodiment is used and the machining positions where no thermal deformation occurs are sequentially determined in the procedure illustrated in the flowchart of FIG. 11, then a predetermined machining order will be formed (see FIG. 12). When the machining is performed according to this machining order, in some cases, multiple unmachined positions distant from each other may be left unprocessed, leading to a problem in terms of machining efficiency. According to the second embodiment, such a problem is solved to improve the machining efficiency.

Figure 13:
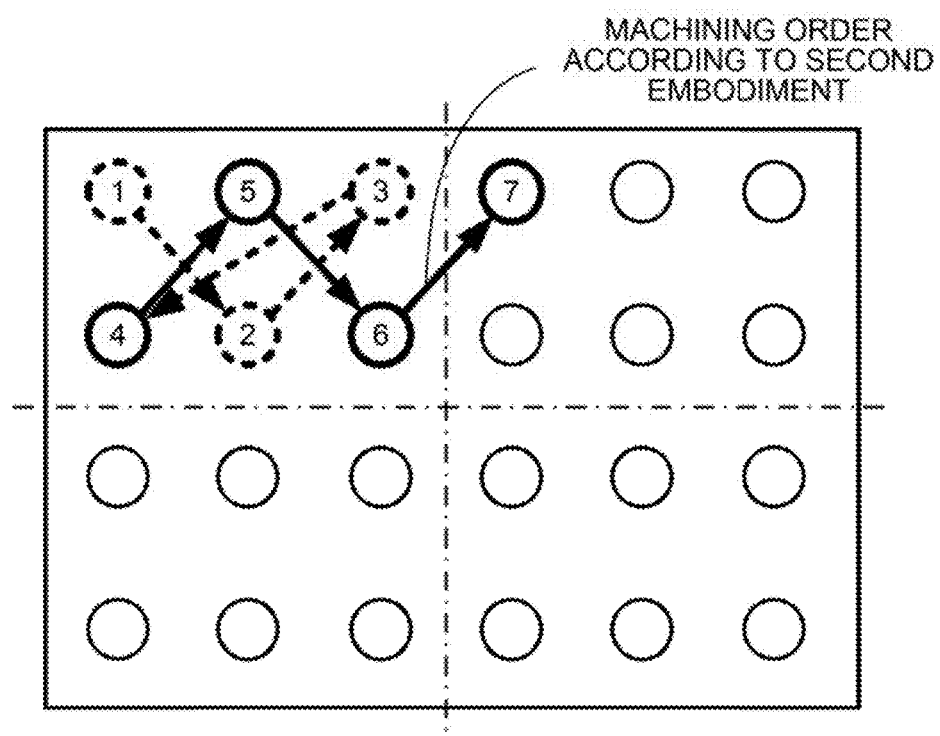
FIG. 13 is a diagram illustrating an example of the scheme for determination of the machining position according to the second embodiment.

The machining position determination unit 102 according to the second embodiment divides a workpiece into multiple regions. These regions each include multiple machining positions. The machining position determination unit 102 first determines the machining order in the procedure illustrated in the flowchart of FIG. 11 for the machining positions existing in the region to which the first-round machining position pertains (see FIG. 13). When the machining has been completed for all the machining positions in the region, then the machining position determination unit 102 carries out the same or similar process on any other appropriate region (preferably an adjacent region) on which the machining is yet to be performed, At this point, the machining position determination unit 102 determines the first machining position in the region on which the machining is to be performed next such that thermal deformation is not caused by the heat generated at the last machining position in the region on which the previous round of machining was performed and the heat generated by the first machining position in the region on which the next round of machining is performed.

According to this embodiment, the machining order is determined within a region narrower than the entire workpiece, and the traveling distance to the next machining position can be limited to a predetermined distance or shorter than that. By virtue of this, since the distance between the unmachined positions is not increased, the machining efficiency can be improved.

It will be appreciated that division of a workpiece into multiple regions is also disclosed in Japanese Patent No. 5162977. Meanwhile, according to Japanese Patent No. 5162977, it is an operator who needs to create the machining order. Also, according to Japanese Patent No. 5162977, thermal deformation is avoided by performing the machining at a remote region other than an adjacent region after a certain region has been processed. On the other hand, in the numerical controller 1 according to the second embodiment, the next machining position is determined with the influence of the heat taken into account on a per-machining-position basis for both of a case where the next round of machining is to be performed within the same region and a case where the next round of machining involves movement to another region. Hence, it is possible to perform the machining with movement to an adjacent region after a certain region has been processed. By virtue of this, it is made possible to perform the machining with a higher efficiency than that of the scheme disclosed in Japanese Patent No. 5162977.

Third Embodiment

In the numerical controller 1 according to the first embodiment, the machining position determination unit 102 determines the unmachined position having the shortest traveling distance from the previous machining position and involving no thermal deformation as the machining position of the next round. When the machining positions are sequentially determined according to such a scheme (see the flowchart of FIG. 11), a predetermined machining order is formed, which has also been described in the foregoing. However, the machining order that has been formed in this manner is appropriate in terms of avoidance of the thermal deformation but is not necessarily optimized in terms of the machining efficiency. While the above-described second embodiment is also an effective scheme for solving this problem, the third embodiment solves this problem by handling a traveling salesman problem to minimize the traveling route.

A traveling salesman problem is a combinatorial optimization problem that determines, given a set of cities and a traveling cost between a pair of cities (e.g., distance, which is the traveling time between the machining positions in this embodiment), the route that visits each and every city once and returns to the point of departure with the minimum total traveling cost. In other words, the shortest route for a salesperson to visit all the cities while visiting each of them only once is to be determined. As an algorithm for solving the traveling salesman problem, a 2-opt algorithm and a nearest neighbor method are known.

According to the third embodiment, in order to allow application of the traveling salesman problem to the present invention, the machining position determination unit 102 extracts all combinations of a machining position (hereinafter referred to as "original position") and another machining position (hereinafter referred to as "destination") where no thermal deformation occurs when the machining is performed following the machining position. As a result of this, a graph as shown in FIG. 14 can be created.

The machining position determination unit 102 of the first embodiment determines, according to the first to third schemes for determining the machining position, whether or not thermal deformation may occur, sequentially starting from the unmachined position farthest from the original position, and thereby searches for the destination. This scheme is applied and the machining position determination unit 102 of the third embodiment exhaustively extracts the machining positions that can be the destination. Specifically, it performs the determination of whether or not thermal deformation due to the machining occurs for all the machining positions other than the original position, and extracts, as the destination candidates, only the machining positions that have been determined as being free from possible thermal deformation. In addition, the machining position determination unit 102 stores, as a set, the original machining position, the machining position of the destination candidate, and the traveling time from the original position to the destination candidate.

Alternatively, the machining position determination unit 102 may be configured to assign, as a traveling time, a very large value (e.g., 9999, etc.) to the machining position determined as involving occurrence of thermal deformation instead of disqualifying it as a destination candidate.

Figure 14:
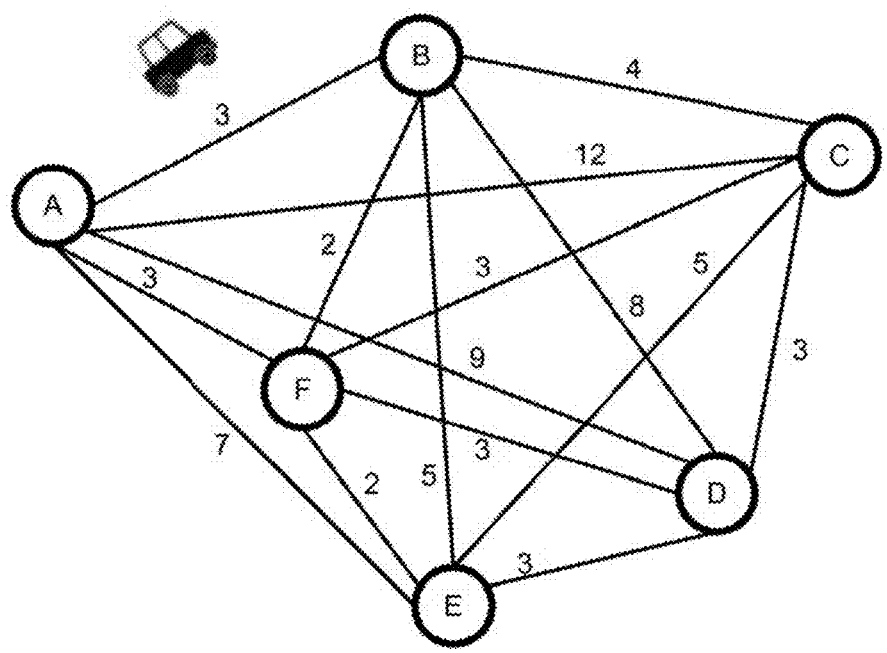
FIG. 14 is a diagram illustrating an example of a scheme for determination of a machining position according to a third embodiment.

FIG. 14 illustrates an example of the information presented in the form of a graph stored in the machining position determination unit 102. The nodes A to F represents the machining positions and the values given to the links interconnecting the nodes represent the traveling time between the machining positions. The traveling time corresponds to the traveling cost between the nodes. The machining position determination unit 102 can acquire the machining order for performing the machining with the minimum cost, i.e., in the shortest time by applying a 2-opt algorithm or nearest neighbor method to this graph.

It will be appreciated that optimization of the machining order based on a 2-opt algorithm is also discussed in Japanese Patent No. 5889606. However, according to Japanese Patent No. 5889606, whether or not thermal deformation occurs is determined based on the distance between the machined holes. This is a method only applicable in a limited way to cases where the heat distribution uniformly changes depending on the distance, as in the case where the machined hole is a round hole (see FIG. 17) and the machined holes have the same shape. In the meantime, in the numerical controller 1 according to the third embodiment, the thermal influence calculation unit 101 computes the heat distribution as a two-dimensional area and the machining position determination unit 102 determines whether or not thermal deformation occurs on the basis of the two-dimensional heat distribution. Accordingly, the numerical controller 1 according to the third embodiment can be implemented on various drilling processes such as a process involving different machining shapes and a sophisticated machining program that involves various machining shapes. Also, since the influence of the heat due to the machining can be precisely evaluated, it is made possible to achieve fine-tuned improvement in the machining efficiency (a shortened traveling route, a shortened machining time, etc.).

Other Embodiments

Whilst the exemplary embodiments of the present invention have been described in the foregoing, the present invention is not limited to the above-described embodiments or examples and can be implemented in other modes with modifications made thereto as appropriate.

For example, in the above-described embodiments, the determination of whether or not thermal deformation occurs is performed taking into account the heat generated from two machined holes. However, the present invention is not limited to this, and occurrence of thermal deformation may be determined taking into account the heat generated from, for example, three or more (n) machined holes. Specifically, in the second or third scheme for determining the machining position, all the amounts of heat generated by the machining at a unmachined position P at a certain point in time and the heat generated from two or more past machined holes and remaining at the same point in time may be accumulated for the respective small sections or the measurement points on the workpiece and, if the total value is equal to or larger than Tt, it can be determined that thermal deformation occurs.

Also, in the above-described embodiments, the machining unit 103 performs the actual machining according to the machining order determined by the machining position determination unit 102. However, the present invention is not limited to this, and the machining unit 103 may be configured to create and output a machining program for performing the machining according to a machining order determined by the machining position determination unit 102 without actually performing the machining.

Whilst the embodiments of the present invention have been described in the foregoing, the present invention is not limited to the above-described embodiments or examples and can be implemented in other modes with modifications made thereto as appropriate.

The invention claimed is:

1. A numerical controller that machines a workpiece to create a plurality of machined holes in the workpiece, the machined holes each having a predetermined machining position and a predetermined machining shape, the numerical controller comprising:
   a thermal influence calculation unit configured to determine, for each of the machined holes, a temporal change in a heat distribution of the workpiece observed when the machined hole having the machining shape is created at the machining position;
   a machining position determination unit configured to determine a next machined hole that does not cause thermal deformation of the workpiece, the next machined hole being determined on the basis of an elapsed time and the heat distribution, wherein the elapsed time is a period of time that elapses from a time at which a previously machined hole is created to another time at which the next machined hole is created and the heat distribution is observed as a result of creation of the previously machined hole and the next machined hole; and
   a machining unit configured to create the machined holes.

2. The numerical controller according to claim 1, wherein the machining position determination unit determines, as the next machined hole, an unmachined hole that does not cause the thermal deformation of the workpiece and resides at a position closest to the previously machined hole.

3. The numerical controller according to claim 2, wherein the machining position determination unit divides the workpiece into multiple regions, determines the next machined hole within one of the regions, the previously machined hole pertaining to the region, and determines the next machined hole in another of the regions when machining is completed for all of the machined holes in the region to which the previously machined hole pertains.

4. The numerical controller according to claim 1, wherein the machining position determination unit determines a machining order for creating the machined holes, the machining order being determined such that the thermal deformation does not occur in the workpiece and a route connecting the machined holes becomes shortest.

5. The numerical controller according to claim 1, wherein the thermal influence calculation unit determines, for each of the machined holes, a temporal change in a range where a temperature of the workpiece becomes $Tt/2$ when the machined hole having the machining shape is created at the machining position,
   the machining position determination unit determines that thermal deformation occurs in the workpiece when the range occurring in the machining of a previously machined hole overlaps with the range occurring in the machining of a next machined hole, where the temperature $Tt$ is a temperature at which the thermal deformation occurs in the workpiece.

6. The numerical controller according to claim 1, wherein the thermal influence calculation unit determines a temporal change in a temperature of the workpiece observed when the machined hole having the machining shape is created at the machining position, the temporal change being determined at multiple measurement points or sections specified on the workpiece,
   the machining position determination unit determines that thermal deformation occurs in the workpiece at either of the multiple measurement points and the sections when a total value of an amount of heat generated by machining of a previously machined hole and an amount of heat generated by machining of a next machined hole exceeds Tt, where the temperature Tt is a temperature at which the thermal deformation occurs in the workpiece.

7. The numerical controller according to claim 1, wherein the thermal influence calculation unit determines the heat distribution sequentially by an approximate calculation scheme including a finite element method.

8. The numerical controller according to claim 1, wherein the thermal influence calculation unit refers to a data set including a predicted value of the heat distribution determined by an approximate calculation scheme including a finite element method so as to determine the heat distribution.

9. The numerical controller according to claim 1, wherein the thermal influence calculation unit refers to a data set including an actual measured value of the heat distribution at the time of sample machining so as to determine the heat distribution.

10. The numerical controller according to claim 1, wherein the machining unit generates a machining program for forming the machined holes according to an order determined by the machining position determination unit.

* * * * *